(12) United States Patent
O'Donnell et al.

(10) Patent No.: US 9,515,512 B2
(45) Date of Patent: Dec. 6, 2016

(54) WIRELESS DATA READER AT CHECKSTAND

(75) Inventors: Patrick M. O'Donnell, Eugene, OR (US); Jon P. C. Williams, Eugene, OR (US); Cameron G. Breckenridge, Oregon City, OR (US)

(73) Assignee: DATALOGIC ADC, INC., Eugene, OR (US)

( * ) Notice: Subject to any disclaimer, the term of this patent is extended or adjusted under 35 U.S.C. 154(b) by 912 days.

(21) Appl. No.: 13/327,643

(22) Filed: Dec. 15, 2011

(65) Prior Publication Data

US 2012/0319645 A1   Dec. 20, 2012

Related U.S. Application Data

(60) Provisional application No. 61/424,010, filed on Dec. 16, 2010.

(51) Int. Cl.
*H02J 7/00* (2006.01)
*H02J 7/02* (2016.01)
*H02J 5/00* (2016.01)

(52) U.S. Cl.
CPC ............... *H02J 7/025* (2013.01); *H02J 5/005* (2013.01)

(58) Field of Classification Search
USPC .......................................................... 320/108
See application file for complete search history.

(56) References Cited

U.S. PATENT DOCUMENTS

| 5,070,293 | A | * | 12/1991 | Ishii et al. ................ 320/108 |
| 5,122,729 | A | | 6/1992 | Itoga et al. |
| 5,189,291 | A | | 2/1993 | Siemiatkowski |
| 6,822,204 | B2 | * | 11/2004 | Clothier .................... 219/528 |
| 7,262,700 | B2 | | 8/2007 | Hsu |
| 7,375,493 | B2 | | 5/2008 | Calhoon et al. |
| 7,683,572 | B2 | * | 3/2010 | Toya ......................... 320/108 |
| 2004/0106376 | A1 | | 6/2004 | Forster |
| 2006/0255943 | A1 | | 11/2006 | Hougen et al. |

(Continued)

FOREIGN PATENT DOCUMENTS

JP    2002015778 A    1/2002

(Continued)

OTHER PUBLICATIONS

LeRoy Johnson, PE, Charging Ahead: Intelligent Wireless Power for Real World Environments, http://www.ecoupled.com/system/files/pdfK198903_ChargingAhead%28ecoupled%29_WhitePaper.pdf, visited Nov. 18, 2011, 8 pages.

(Continued)

*Primary Examiner* — Robert Grant
(74) *Attorney, Agent, or Firm* — Stoel Rives LLP (57) ABSTRACT

A checkstand system including a counter surface within which a plurality of induction charge transmission coils are embedded in or disposed below the counter at selected charge positions about the countertop whereby a cordless peripheral, such as a data reader, is positionable and movable between multiple positions about the counter surface, the peripheral including an induction charge receiving coil operative to receive a charge current from one of the induction charge transmission coils when the peripheral is placed in proximity of a selected one of the charge positions on the checkstand. In one configuration, the system includes a temperature sensing component disposed proximal to an induction charge transmission coil and a controller operative for receiving a temperature signal from the temperature sensing component and adjusting the charge current delivered to the induction charge transmission coil in response to the signal.

22 Claims, 9 Drawing Sheets

(56) References Cited

U.S. PATENT DOCUMENTS

| | | | |
|---|---|---|---|
| 2006/0289654 A1 | 12/2006 | Robinson et al. | |
| 2007/0236174 A1 | 10/2007 | Kaye | |
| 2008/0105743 A1 | 5/2008 | Mills | |
| 2009/0224723 A1* | 9/2009 | Tanabe | 320/108 |
| 2010/0029202 A1 | 2/2010 | Jolivet et al. | |
| 2010/0201513 A1* | 8/2010 | Vorenkamp et al. | 320/108 |
| 2010/0270970 A1* | 10/2010 | Toya | H02J 7/0027 |
| | | | 320/108 |

OTHER PUBLICATIONS

Furnishing Knowledge, e-Coupled, http://www.ki.com/pdfs/NJPA_Newsletter_KI_eCoupled.pdf, visited Nov. 18, 2011, 1 page.

Brad Molen, Engadget Primed: How Wireless and Inductive Charging Works, http://www.engadget.com/2011/06/24/engadget-primed-how-wireless-and-inductive-charging-works/-, visited Nov. 18, 2011, 12 pages.

\* cited by examiner

Work surface with flat spiral wound power coils

Fig. 5

Fig. 6    Work surface with a switch back power coil

WIRELESS DATA READER AT CHECKSTAND

RELATED APPLICATION DATA

This application claims priority to provisional application Ser. No. 61/424,010 filed Dec. 16, 2010, hereby incorporated by reference.

BACKGROUND

The field of the present disclosure relates to checkout systems and more particularly retail checkstands or other checkout stands (e.g., a parcel distribution station) that incorporate portable data readers and other electronic devices and/or related systems and methods of operation.

Typical checkstands such as at a retail check station include counter space for accommodating placement of articles to be scanned. Certain checkstands include both a fixed scanner and a handheld scanner whereby certain (e.g., smaller) articles may be scanned by passing them through the scan volume of the fixed scanner and certain other items (e.g., larger or bulkier items such as items remaining in the shopping cart) may be preferably scanned with the handheld scanner. The present inventor has recognized certain limitations for arrangements and configurations of checkstands including one or more portable movable devices such as handheld scanners.

DETAILED DESCRIPTION OF EMBODIMENTS

With reference to the above-listed drawings, this section describes particular embodiments and their detailed construction and operation. The embodiments described herein are set forth by way of illustration only and not limitation. It should be recognized in light of the teachings herein that there is a range of equivalents to the example embodiments described herein. Most notably, other embodiments are possible, variations can be made to the embodiments described herein, and there may be equivalents to the components, parts, or steps that make up the described embodiments.

For the sake of clarity and conciseness, certain aspects of components or steps of certain embodiments are presented without undue detail where such detail would be apparent to those skilled in the art in light of the teachings herein and/or where such detail might obfuscate an understanding of more pertinent aspects of the embodiments. Various types of data acquisition devices, such as optical data readers are generally known including imaging-based data readers and laser scanners, both fixed and handheld. For the purposes of the present description, the terms scanner and data reader may be used interchangeably.

Figure 1:
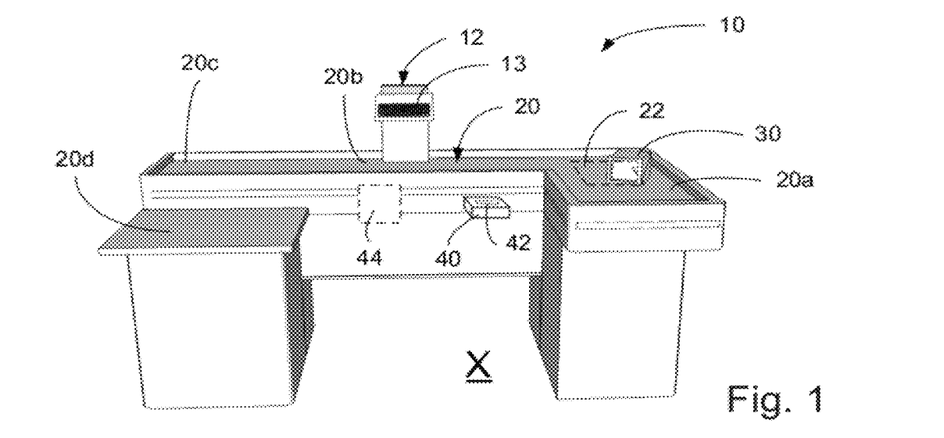
FIG. 1 is a diagrammatic view POS checkstand according to a first embodiment.
Figure 2:
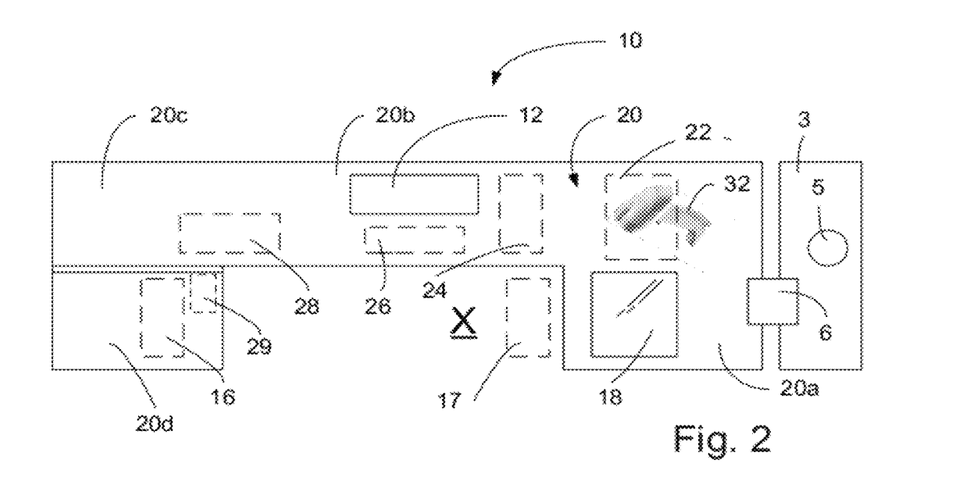
FIG. 2 is a top view of the POS checkstand of FIG. 1 with some modifications and alternatives.

FIGS. 1-2 illustrate a retail checkout station/checkstand 10 according to a first preferred embodiment, with FIG. 2 illustrating some alternative configurations as described below. FIG. 1 in particular illustrates the checkstand 10 having a work surface/counter 20, a POS terminal 12 with display and input keyboard 13, a barcode scanner or other data reader (with or without optional weigh scale) 30. The checkstand 10 may comprise any suitable configuration, but is shown in this example with an L-shaped counter 20 having a top (work) surface on which articles to be scanned and checked out are placed. Technically speaking, the counter shape is illustrated as an inverted "L" (as viewed from a top, downwardly-facing viewpoint) with flow of articles being from right to left from the perspective of an operator standing in the position designated by the "X" on the floor. If the counter were arranged with a left to right item flow, the counter would have a non-inverted L-shape. The counter 20 is shown with a first/front section 20a (at the bottom of the "L"), a center section 20b, and a rear section 20c. The checkstand 10 is also shown with a lowered counter section or bagging section 20d. The bagging section 20d may include a bag rack 16 illustrated in FIG. 2. A second bag rack 17 may be included proximate the counter front section 20a.

FIG. 1 illustrates a first embodiment with cordless/movable data reader 30 shown resting on the counter first section 20a. The data reader 30 is shown as a vertical window scanner having an external configuration similar to the Magellan® 1100i of Datalogic Scanning, Inc. in Eugene, Oreg. The data reader 30 is preferably a cordless, freestanding unit that can be moved about the countertop/counter 20 and located/aimed at any desired position. The data reader 30 may comprise a handsfree style of reader whereby items to be read are presented to or passed through the read zone in front of the reader window. Such a cordless unit may be easily repositioned at various locations about the counter because there is no cord to tangle with other components or otherwise interfere with the movement/scanning of items. The data reader 30 is provided with an internal power source (e.g., a rechargeable battery) that is charged by an inductive charging system. The reader 30 has an induction coil disposed proximate a bottom surface thereof. The counter 20 is constructed with a charging area/array 22 comprised of an induction coil charging array of a suitable configuration as will be described in more detail below. As illustrated in both FIGS. 1 and 2, the charging array 22 is positioned in the counter front section 20a, but the charging array may be positioned at any suitable location, and the checkout station 10 may include one or more charging areas.

FIG. 2 illustrates an alternate style of data reader comprising a handheld reader 32. The checkout counter 20 is further shown with an optional in-counter reader 18 which may comprise a single window reader, such as the Magellan® 2300HS or a multi-window reader, such as the Magellan® 8500 scanner-scale, both from Datalogic Scanning, Inc., Eugene, Oreg. Items 5, 6 brought to the counter 20 via conveyor 3 may then be scanned either by the in-counter reader 18 or the handheld reader 32. Large or bulky items that might be left in the shopping cart may also be scanned by the handheld reader 32.

FIG. 2 also illustrates several positions for the charging area, such as charging area 22 in the counter forward section; charging area 24 to the right side of the POS terminal 12; charging area 26 in the counter center section 20b to the front side of the POS terminal 12; charging area 28 in the counter rear section 20c; or in the bagging area shelf 20d. Alternately, it may be advantageous to locate the charging area in a position which is less accessible to the customer. For example, the charging position 26 is, relative to the customer, behind the POS terminal 12 and thus somewhat blocked from view/access to the customer. A charging area 29 is shown positioned on the lower bagging shelf 20d and thus is below and behind the countertop 20.

Alternately, as shown in FIG. 1, the counter 20 may include a specialized lower shelf 40 having a charging area 42. The handheld reader may be then placed on the shelf somewhat out of sight and out of reach of the customer. In yet another alternative, the countertop 20 may be supplied with a recess or slot 44 into which the cordless reader 32 may be inserted, the slot including a charging area therein.

Figure 3:
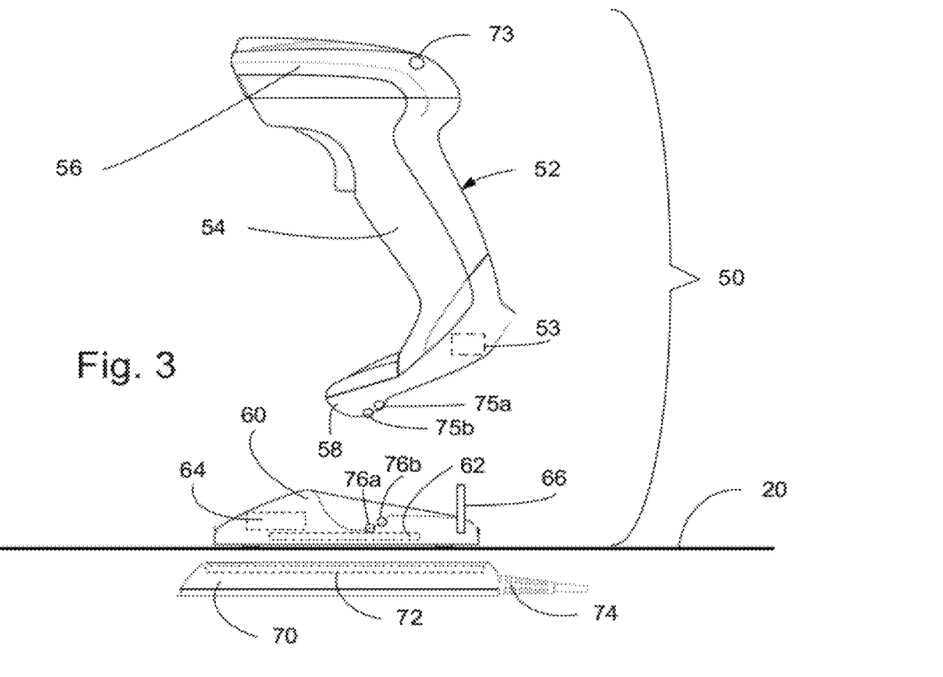
FIG. 3 is a diagrammatic view of a handheld data reader and charging station according to an embodiment.

FIG. 3 illustrates an example configuration for a data reader 50 of the handheld/portable type. The handheld data reader 50 is similar to the reader 32 shown in FIG. 2. The reader 50 includes a housing unit 52 having a handle section 54, a head or upper section 56 and a lower or foot section 58. Though illustrated in an exploded view, the lower section 58 is connected (either pivotally or non-pivotally) to the cradle/base section 60 in a suitable fashion. The base 60 serves as a platform for supporting the reader housing 52 onto a horizontal surface such as the countertop 20. In one optional configuration, the unit may comprise a built-in stand whereby the housing 52 remains connected to the base 60 when operated either in the handheld/portable mode or self-supporting in a hands-free operating mode. The data reader 50 is preferably a handheld cordless unit that may communicate wirelessly (such as via antenna 66) with the scanner 30, the host or other controller. The host or controller may be included within the POS 12, for example. The data reader 50 includes a battery 64 (shown schematically in the figure) which is rechargeable type operably connected to a power supply and induction receiving coil 62. Alternately, as a cordless unit, the data reader may communicate to a receiver disposed in base 70 which has a wired connection (e.g., a cable) 74 to the host. The battery 64 may be located in any suitable location either in the housing 52 or the base section 60. Power is transferred wirelessly from the charging unit 70 disposed below the surface of the countertop 20 via transmission from induction transmission coil 72 of the charging unit 70 to the induction receiving coil 62 in the base section 60 thus requiring no physical electrical contact between the base section 60 and the induction charging unit 70. A calibration switch 73 is used to establish resonance between the induction transmission coil 72 and the receiving coil 62. The induction charging unit 70 is suitably connected to a controller and power supply via the cable 74, but the cable 74 is positioned beneath the counter surface and keeps the top surface clear of cords thus does not interfere with movement of items about the countertop 20.

In one example configuration, it is envisioned that there will be multiple charging coil units 70 (of any suitable style or arrangement) arranged about the countertop thus enabling the cradle section 60 to be placed in any suitable location (proximate a charging coil) and be charged.

In another configuration of the scanner unit 50, the scanner portion 52 may be removable from the base portion 60 (which may be configured as a cradle) with a battery 53 on board the scanner portion being charged from the receiving coil 62 to electrical contacts 76a, 76b and then to mating electrical contacts 75a, 75b in the scanner portion. Though the scanner portion 52 is illustrated to be placed in the cradle portion 60 so as to be disposed in a vertical orientation, other cradle configurations are envisioned. For example, a larger/wider cradle may be constructed that accepts the scanner portion in a more laid down or horizontal orientation.

Having multiple charging areas about the countertop allows the user to place peripheral devices, such as the scanners 30, 32, 50, or even other devices such as the POS terminal 12, at any convenient location. The checkstand 10 may thus assume many different configurations depending on operational needs or personal preference without requiring re-wiring or interfering cable positioning. For certain peripheral devices such as the POS terminal 12, additional connecting/securing mechanism may be optionally included to reduce possibility of tipping.

The scanner 30, 32, 50 or the cradle unit/base 60 may be provided with charging indicators, such as LED lighting, that alight indicating that the unit has been placed/aligned suitably over a charging coil. The lighting may be controlled to increase/decrease in intensity to assist a user in positioning the scanner or cradle in an optimum position over a charging coil. Where the countertop is equipped with multiple discrete charging locations, the top surface may be configured with suitable surface markings to indicate charging "hot spots" to assist the user in placing the reader in an optimum charging location.

Figure 4:
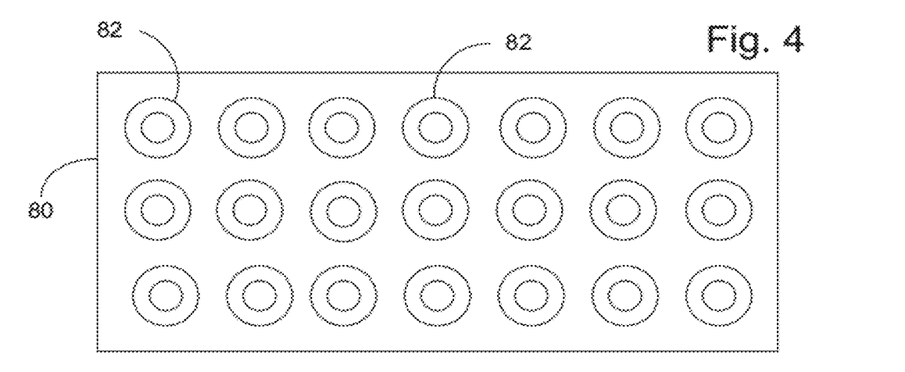
FIG. 4 is a diagrammatic top plan view of a first transmission coil configuration.

The induction transmission coils themselves may comprise any suitable configuration. FIG. 4 illustrates an array 80 of toroidal coils 82 placed in such a way as to allow a peripheral fitted with a receiving coil to be placed in many locations on the work surface. The array 80 of one or more coils 82 may comprise a charging section, such as charging sections 22, 24, 26, etc. in the countertop 20 as shown in FIGS. 1-2.

Figure 2A:
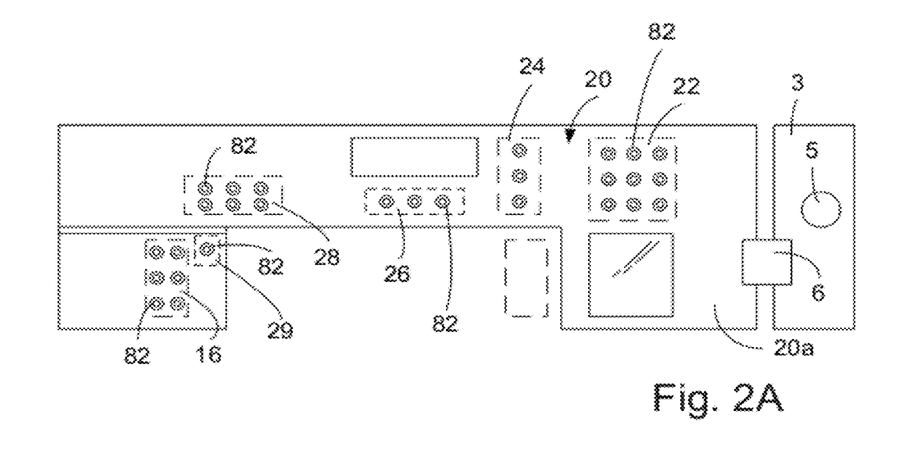
FIG. 2A is a diagrammatic view of the countertop of FIG. 2 showing additional details of one configuration.

FIG. 2 illustrates discrete placement of coils or coil arrays arranged about the countertop and FIG. 2A illustrates an example configuration for the coil arrays, with one or more coils 82 disposed within each of the coil placement sections. In this configuration of countertop 20, the coil array section 22 has nine coils 82; coil array sections 24, 26 each have three coils 82; coil array sections 16 and 28 each have six coils 82; and coil array section 29 has one coil 82.

Figure 2B:
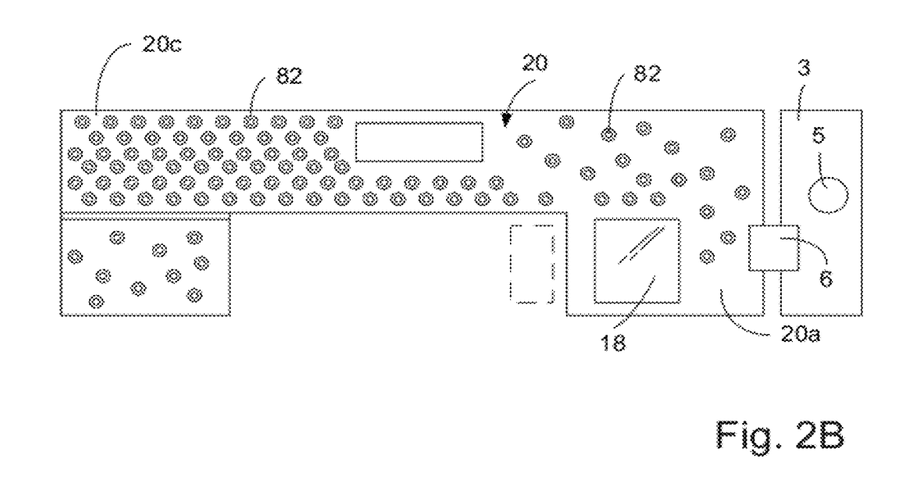
FIG. 2B is a diagrammatic view of a countertop according to an alternate embodiment.

FIG. 2B illustrates an alternate configuration whereby the entire countertop 20 (or a substantial portion thereof) may be fitted with transmission coils 82. In such a configuration, the handheld reader may be positioned above a charge coil no matter where it is placed on the countertop section. As shown the coils may be arranged in a grid pattern (as shown on the left side of the figure, or counter section 20c) or a more random pattern (as shown on the right side of the figure, or counter section 20a). The coils may thus be arranged in any suitable configuration or density.

Figure 5:
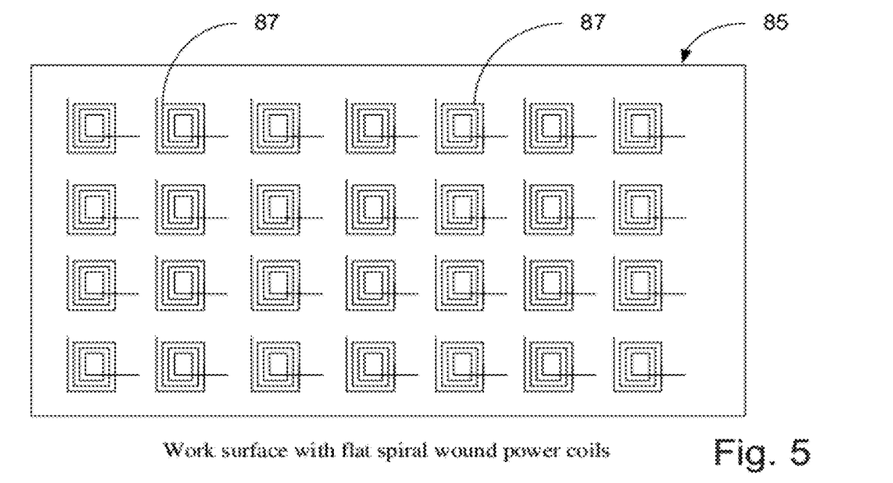
FIG. 5 is a diagrammatic top plan view of a second transmission coil configuration.

Coil types can take any suitable form. FIG. 5 shows an array 85 of flat spiral wound coils 87 placed in such a way as to allow many locations in which a peripheral could be placed at various positions about the work surface and still receive induction charging power.

Figure 6:
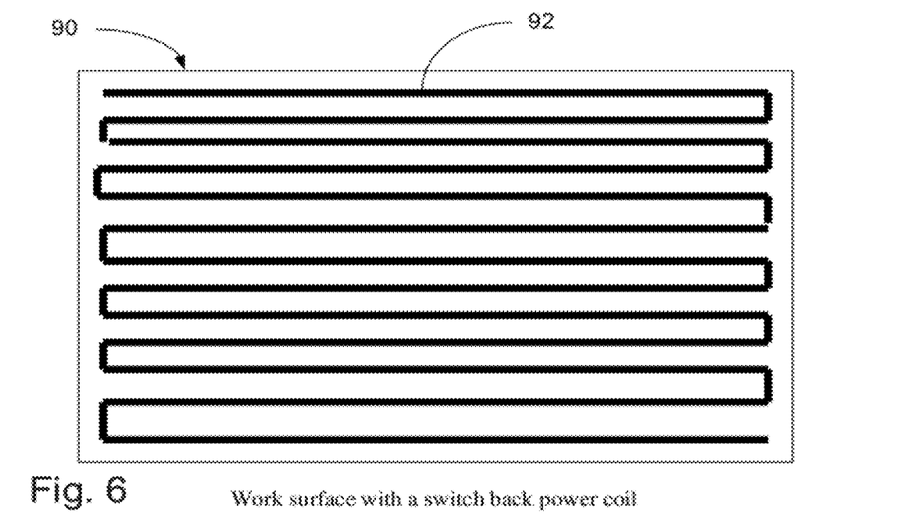
FIG. 6 is a diagrammatic top plan view of a third transmission coil configuration.
Figure 7:
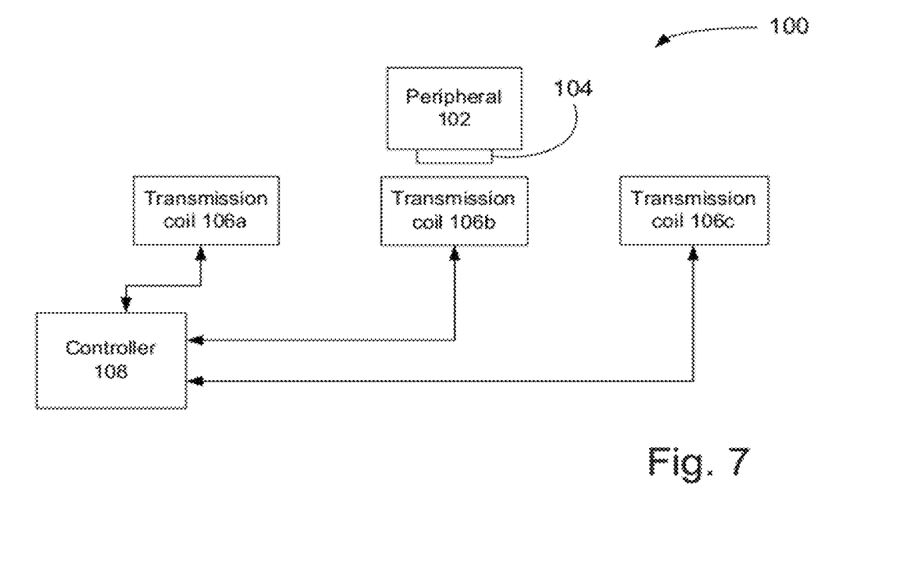
FIG. 7 is a system diagram of a charging system according to a preferred embodiment.

FIG. 6 illustrates another power coil arrangement 90 in which a single coil 92 is formed by laying magnetic wire in a switch back arrangement. Again this layout provides many locations in which a peripheral (bar code scanner, display, weigh scale) could be placed at various positions on the work surface and still receive power.

Where the checkstand is equipped with multiple charging coils, drive electronics may drive all the coils at once even though only one coil might be in use with the device on the work surface. In a preferred embodiment, as shown in FIG. 7, a control system 100 is provided (e.g. controller 108) whereby the drive electronics sense presence of a device 102 with a receiving coil 104 drawing power from a specific coil 106b and selectively driving only that coil, removing drive current from those other coils 106a, 106c not in use. The sensing may comprise circuitry that monitors a change in drive current or a change in inductance as a peripheral device 102 placed within proximity of the specific transmission coil 106b. Such a drive control system may advantageously increase efficiency of the wireless power charging system.

Figure 8:
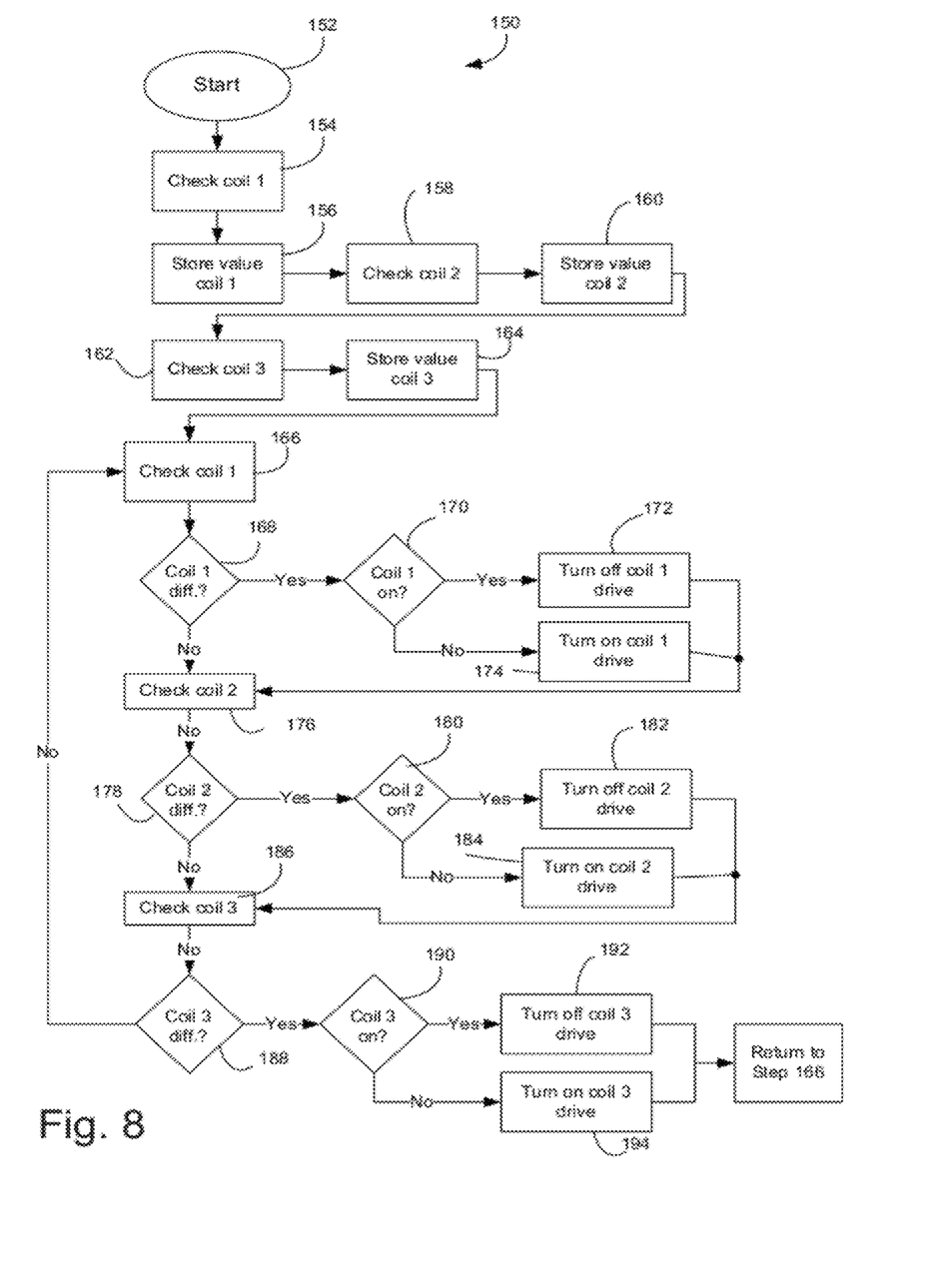
FIG. 8 is a flow chart of a coil sensing methodology according to a preferred embodiment.

FIG. 8 is a flow chart for a coil sensing methodology 150 according to a first embodiment. This example describes a three coil system, but the concept may be expanded to as many coils as would be needed for a particular wireless checkstand implementation. Starting at Step 152, the first step at Step 154 is to check or measure either the voltage or the current of a first coil (Coil 1) in response to a stimulus signal, and then at Step 156 store that value for future reference. Each coil in the stand would be measured which provides a beginning initialization. In this three coil example, the second coil (Coil 2) is checked at Step 158, and the voltage/current value for Coil 2 is stored at Step 160. Then the third coil (Coil 3) is checked at Step 162, and the voltage/current value for Coil 3 is stored at Step 164.

Once all the coils have been checked and initial values stored, the current/voltage value of Coil 1 is again measured with the same stimulus signal at Step 166 and then determined at Step 168 if the Coil 1 value has changed. If No, proceed to Step 176 to check Coil 2; if Yes, proceed to Step 170 to determine whether Coil 1 is on. If it is determined at Step 170 that Coil 1 is on (Yes), proceed to Step 172 and turn Coil 1 drive off then proceed to Step 176. If at Step 170 it is determined that Coil 1 is not on (No), proceed to Step 174 and turn on Coil 1 drive then proceed to Step 176.

Having dealt with Coil 1, the method proceeds to Step 176 to check Coil 2 whereby the current/voltage value of Coil 2 is again measured and then determined at Step 178 if the Coil 2 value has changed. If No, proceed to Step 186 to check Coil 3; if Yes, proceed to Step 180 to determine whether Coil 2 is on. If it is determined at Step 180 that Coil 2 is on (Yes), proceed to Step 182 and turn Coil 2 drive off then proceed to Step 186. If at Step 180 it is determined that Coil 2 is not on (No), proceed to Step 184 and turn on Coil 2 drive then proceed to Step 186.

Having dealt with Coils 1 and 2, the method proceeds to Step 186 to check Coil 3 whereby the current/voltage value of Coil 3 is again measured and then determined at Step 188 if the Coil 3 value has changed. If No, return/cycle back to Step 166 to again check Coil 1; if Yes, proceed to Step 190 to determine whether Coil 3 is on. If it is determined at Step 190 that Coil 3 is on (Yes), proceed to Step 192 and turn Coil 3 drive off then proceed to Step 196. If at Step 190 it is determined that Coil 3 is not on (No), proceed to Step 194 and turn on Coil 3 then proceed to Step 196. By this process of monitoring the coil current or voltage, it can be determined if a wireless peripheral has been placed over the coil or removed from the proximity of the coil.

Figure 9:
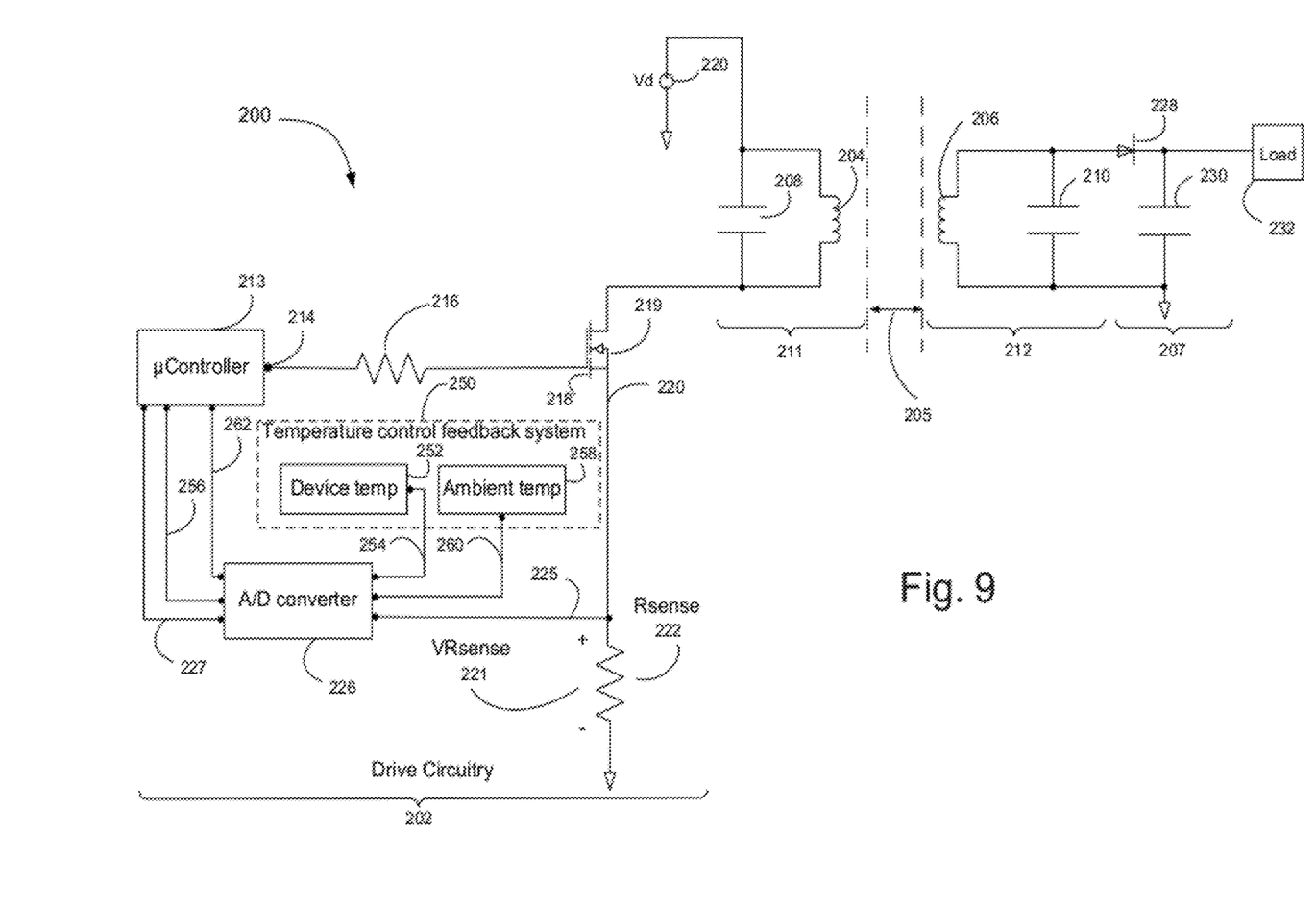
FIG. 9 is a schematic diagram of a wireless power transfer system including a temperature control feedback system.
Figure 10:
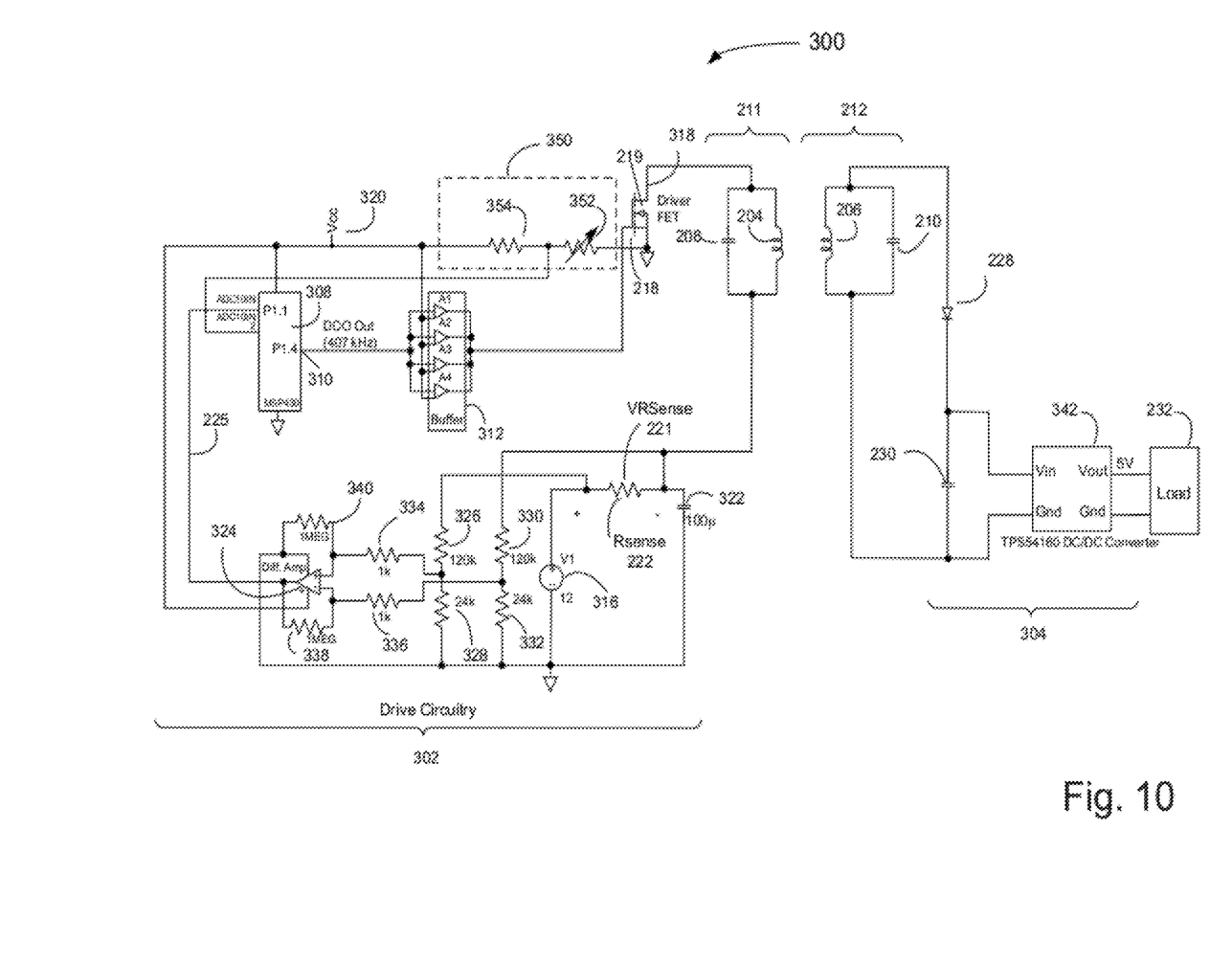
FIG. 10 is a schematic diagram of an alternative embodiment of the wireless power transfer and temperature control feedback systems of FIG. 9.

FIGS. 9 and 10 illustrate schematic diagrams for alternative embodiments of wireless power systems suitable for powering or charging data readers. Identical components share common numerical labels in FIGS. 9 and 10.

The schematic in FIG. 9 illustrates a wireless power system 200 embodiment. The wireless power system 200 includes drive circuitry 202 for driving a power-transmitting coil 204 to induce an electromagnetic field in a gap 205. Across the gap 205, the wireless power system 200 includes a power-receiving coil 206 with associated receiving circuitry 207 to convert the received oscillating power into a steady DC voltage, or alternatively, a steady current. Power is wirelessly transferred between the two coils (204, 206) when the drive circuitry 202 produces a peak-to-peak signal to drive the power-transmitting coil 204 and inductively couple the power-receiving coil 206. The associated receiving circuitry 207 shown in FIG. 9 converts the oscillating received power into a steady DC voltage used to power electronics such as the cordless/movable data reader 30 or handheld reader 32 described above.

For maximum efficiency, inductive power transfer systems should ideally operate in resonance. Power-transmitting and power-receiving coils 204 and 206 are each paired with capacitors 208 and 210 to form resonant tank circuits that are ideally driven at their natural resonant frequency. The power-transmitting coil 204 and the capacitor 208 form a power-transmitting resonant tank circuit 211, coupled in close proximity to a power-receiving tank circuit 212 comprised of the power-receiving coil 206 and the capacitor 210. The components in the power-transmitting and power-receiving resonant tank circuits are selected so the tank circuits have matching resonant frequencies.

The drive circuitry 202 includes a microcontroller (μController) 213 with an output 214 in series with a resistor 216. The output 214 drives a gate 218 of a switching N-channel MOSFET transistor 219 with a 5-volt peak-to-peak square wave signal that produces current flow in the power-transmitting coil 204. The current flow is sourced from a voltage source (Vd) 220 and continues through the power-transmitting coil 204. The current exits a source 220 of the transistor 219 and produces a monitoring voltage (VRsense) 221 across a resistor (Rsense) 222. The monitoring voltage 221 is measured from a connection 224 at an input 225 of an analog to digital converter (A/D converter) 226. The A/D converter 226 samples the monitoring voltage 221 and provides a digital value of the voltage 221 to the microcontroller 213 along a connection 227. The microcontroller 213 reads the digital value and adjusts the drive frequency signal to ensure that the power-transmitting coil 204 and power-receiving coil 206 operate in resonance.

On the power-receiving side, a diode 228 and a reservoir capacitor 230 form the associated receiving circuitry 207. The associated receiving circuitry converts the received oscillating power into a DC voltage to power an electrically connected load 232.

FIG. 9 also illustrates an optional temperature control feedback system 250 operative to increase the control and response of the wireless power transfer system 200 in situations where the system 200 is operating in non-resonant modes. These non-resonant modes can arise when an object, other than the power-receiving coil 206, is placed in close proximity to the power-transmitting coil 204 such that the object inductively couples with the power-transmitting coil 204 in a non-resonant or inefficient manner. If the wireless power transfer system 200 becomes non-resonant, the efficiency of the system 200 decreases and as a result, component(s) in the drive circuit 202 can heat up. Using a thermal sensor to detect a heat increase provides an indication that the wireless power transfer system 200 has become non-resonant. When this heat increase is detected, the drive frequency signal can be shut down thereby protecting both the power-transmitting coil 204 and any coupled object. An advantage of the temperature control feedback system 250 is that all of the temperature detection and control components are contained on the transmitting side of the wireless power transfer system 200 so no direct communication between the receiving circuitry 207 and the drive circuitry 202 is necessary.

FIG. 9 depicts a temperature sensitive electronic component (Device temp) 252, such as a thermistor, thermocouple, or other suitable device(s) in relatively close proximity to the drive circuitry 202 (particularly the MOSFET transistor 219) of the wireless power transfer system 200. With the addition of the Device temp component(s) 252, the wireless power transfer system 200 can react or shutdown to prevent damage if the MOSFET transistor 219 or any other components overheat. The Device temp component 252 reacts to changes in temperature of the transistor 219, and provides a device temperature feedback voltage to the A/D converter 226. The A/D converter 226 first, (1) receives the device temperature feedback voltage along an electrical connection 254 and converts the voltage into a digital value; and second (2) provides the digital value to the microcontroller 213 along an electrical connection 256.

Another temperature sensitive electronic component (Ambient temp) 254, produces an ambient temperature voltage in proportion to the ambient temperature. The A/D converter 226 first, (1) receives the ambient temperature voltage along an electrical connection 260 and converts the voltage into a digital value; and second, (2) provides the digital value to the microcontroller 213 along an electrical connection 262. By using two thermal sensors, Device temp 252 and Ambient temp 254, the increase in the drive circuit 202 temperature may be isolated from any increase in ambient temperature to thereby approximate the total amount of energy dissipated. The total amount of energy is calculated in software with the microcontroller 213 subtracting the ambient temperature value from the device temperature feedback. Alternatively, ambient temperature voltages may be subtracted in hardware using a differential operational amplifier configuration.

FIG. 10 is a schematic illustrating alternative embodiments of wireless power transfer and temperature control feedback systems. As in FIG. 9, a wireless power transfer system 300 in FIG. 10 includes drive circuitry 302 for driving the power-transmitting coil 204, and a power-receiving coil 206 with associated power-receiving circuitry 304 to convert the oscillating received power into a steady DC voltage, or alternatively, a steady current. The drive circuitry 302 produces a peak-to-peak signal to drive the power-transmitting coil 204 to induce an electromagnetic field. The power-receiving coil 206 is inductively coupled to the power-transmitting coil 204, which permits wireless power transfer. The associated receiving circuitry 304 converts the received power into a steady DC voltage used to power or charge a load 232. The power-transmitting coil 204 and power-receiving coil 206 are paired with the capacitors 208 and 210 to form resonant tank circuits that are ideally driven at their natural resonant frequencies as described in FIG. 9.

The drive circuitry 302 includes a microcontroller 308. A suitable microcontroller is the model MSP430 available from Texas Instruments of Dallas, Tex. The microcontroller 308 has an output 310 that is connected to each buffer input of a quad buffer (Buffer) 312. A suitable Buffer 312 is the model 74LV125 available from NXP Semiconductors of Eindhoven, Netherlands. The Buffer 312 outputs are electrically combined and connected to the gate 218 of the switching N-channel MOSFET transistor 219. In this arrangement, the microcontroller 308 generates a 5-volt peak-to-peak square wave, preferably at 407 kHz, that is buffered and used to drive the gate 218 of the transistor 219 to produce current flow in the power-transmitting coil 204.

In FIG. 10, the resistor 222 is connected in series between a voltage source 316 and the transmitting resonant tank circuit 211. The transmitting resonant tank circuit 211 is then connected in series to a drain 318 of the transistor 219. It may be observed that despite the slightly different arrangement of the resistor 222 from FIG. 9, the resistor 222 may function in essentially the same way for both FIGS. 9 and 10. The current flowing from the voltage source 316 flows into the resistor 222 to produce the monitoring voltage 221 across the resistor 222 that is used to monitor the current flowing into the drain 318 of the transistor 219. The arrangement in FIG. 10 allows two different voltage sources to be used on the transmitter side: (1) the voltage source 316 is used for producing higher power in the power-transmitting coil, and (2) another lower power voltage source 320 is used for powering digital integrated circuits such as the microcontroller 308 and the Buffer 312. The configuration of voltage source 316 and resistor 222 includes an additional shunt capacitor 322.

FIG. 10 also illustrates that the voltage drop across the resistor 222 is measurable with increased resolution by using a differential operational amplifier 324 and two matching sets of voltage dividers established principally by resistors 326, 328, 330, and 332. A suitable operational amplifier 324 is the model LM321 available from National Semiconductor of Santa Clara, Calif. The differential operational amplifier 324 is biased for common-mode rejection with equal input resistors 334 and 336, and a feedback resistor 338 with resistance equal to a gain resistor 340. Because the operational amplifier 324 is set up in one example in a differential configuration with a gain of 1000, the measurable voltage drop across the resistor 222 is much more sensitive than the single-ended configuration of FIG. 9. Thus, the analog to digital converter module built within microcontroller 308 may sample the monitoring voltage 221 with higher resolution and provide a higher precision digital value. As in the previous embodiment, the microcontroller 308 reads the digital value to adjust the drive frequency signal to ensure that the power-transmitting coil 204 and power-receiving coil 206 operate in resonance.

On the power-receiving side, as shown in FIG. 9, the diode 228 and the reservoir capacitor 230 of FIG. 10 form the associated receiving circuitry 304 and function the same way as in FIG. 9, i.e., to convert the oscillating received power into a DC voltage. However, associated receiving circuitry 304 includes an additional DC/DC converter 342 to regulate the DC voltage. A suitable DC/DC converter is the model TPS54160 available from Texas Instruments of Dallas, Tex.

A temperature control feedback system 350 is illustrated in FIG. 10 as a thermal sensor 352 with one side connected to ground, and the other side forming a voltage divider circuit with a resistor 354 that is connected to the voltage source 320. As in the previous example of FIG. 9, the thermal sensor 352 is near transistor 219 such that the wireless power transfer system 300 can react or shutdown if the MOSFET transistor 219 or other components overheat. Unlike FIG. 9 however, only one thermal sensor is present. The thermal sensor 352 produces a voltage measurement corresponding to the temperature of the drive circuit 302 in ambient conditions. The analog to digital converter module inside the microcontroller 308 receives and converts the temperature measurement into a digital value. The microcontroller 308 checks the digital value against programmed temperature limits and adjusts the drive signal accordingly.

Figure 11:
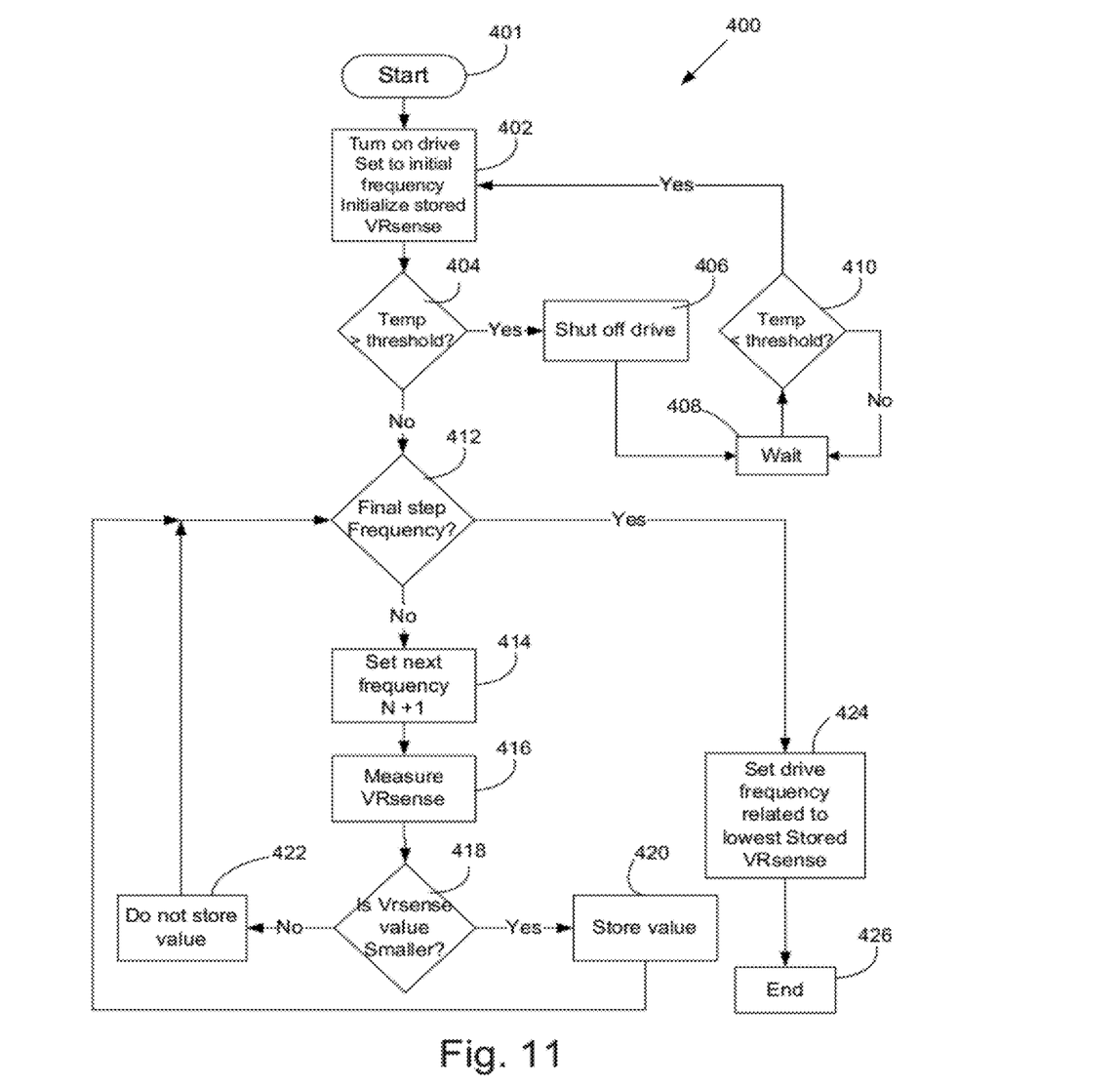
FIG. 11 is a flow chart of a process of adjusting a wireless power system to maintain resonance for optimal power transfer.

A properly configured resonant power transfer system is much more efficient than a transformer coupled system like that of a toothbrush charger, which has low efficiency. However, for a resonant power transfer systems to operate efficiently, i.e., at optimum power transfer, the drive signal frequency is preferably adjusted to establish resonance in the transmitting and receiving coils. FIG. 11 depicts a flow chart for a process 400 of adjusting a wireless power system such that the power-transmitting and power-receiving coils maintain resonance. Adjustment may take place when the data reader 50, depicted in FIG. 3, is placed on the charging unit 70. Calibration may be initiated manually with a user input, e.g., actuating the calibration switch 73 (shown in FIG. 3), or automatically with the microcontroller sensing the presence of a power-receiving coil. In either case, the microcontroller adjusts the drive frequency of the charging unit 70 to establish optimum power transfer. The drive frequency can then be stored to facilitate mating of the charging unit 70 and the data reader 50. If the data reader 50 is later replaced, the calibration process can be executed again to ensure optimum performance with a new data reader.

Turning to FIG. 11, a preferred process 400 adjusting a charging system includes the following steps: Step 401, the data reader 50 is placed on the charging unit 70, calibration is initiated, and the process proceeds to Step 402.

Step 402: the system turns the drive frequency on, sets the frequency to a specified initial frequency selected to be less than a nominal resonant frequency, stores an initial voltage measurement 221 across the resistor 222, and proceeds to Step 404.

Step 404: checks the temperature of the drive transistor 219 and associated components to ensure operation within safe temperature limits. As discussed above with reference to FIG. 9, the temperature may be measured by comparing the ambient temperature to that of the drive circuit 202, or without ambient temperature as depicted in FIG. 10. If the device exceeds a high temperature threshold at Step 404 (Yes), the process proceeds to Step 406, otherwise it proceeds to Step 412.

Step 406: shuts off the drive if the device exceeds a high temperature threshold at Step 404 (Yes) and proceeds to Step 408.

Step 408: waits for a configurable time and proceeds to Step 410.

Step 410: rechecks the temperature. If the temperature has cooled below a cool down temperature limit at Step 410 (Yes) the process begins again at Step 402, otherwise the process proceeds to Step 408.

Step 412: checks whether the drive frequency is less than the Final step frequency when the device does not exceed a high temperature threshold at Step 404 (No). If the drive frequency is less than the Final step frequency at Step 412 (No) the process proceeds to Step 414, otherwise the process proceeds to Step 424.

Step 414: increments the present drive frequency by some pre-configured incremental step frequency when the drive frequency is determined to be less than the Final step frequency at Step 412 (No). The process proceeds to Step 416.

Step 416: measures the voltage across the resistor 222 to generate the differential or single-ended voltage measurement, VRsense, and proceeds to Step 418.

Step 418: checks whether the newly measured VRsense is less than the value of the stored VRsense measurement. If the new VRsense is less than the stored VRsense at Step 418 (Yes) the process proceeds to Step 420, otherwise at Step 418 (No) the process proceeds to Step 422.

Step 420: the new VRsense measurement from Step 416 and associated drive frequency from Step 414 are stored. Step 420 then process proceeds back to Step 412.

Step 422: the new VRsense measurement from 416 and associated drive frequency from Step 414 are discarded if at Step 418 (No) the new VRsense is not less than the stored VRsense value. Step 422 then process proceeds to Step 412.

Steps 412-422 are repeated until the drive frequency is incremented over a pre-specified range in order to find the resonant frequency of the coils.

Step 424: the drive frequency is set to the stored frequency from Step 420 when the drive frequency exceeds the Final step frequency at Step 412 (Yes). The process proceeds to Step 426.

Step 426: calibration is complete.

The system for charging an electrical storage (e.g., battery) of an electronic device (e.g., cordless data reader) described above may be implemented on a single induction charge transmission coil at a selected charge position (e.g., embedded in a counter or wall) or a system of multiple induction charge transmission coils disposed at a selected charge positions. Thus in one configuration, the system includes least one induction charge transmission coil; a controller including drive circuitry operative for controlling charge current delivered to the induction charge transmission coil; a temperature sensing component for generating a temperature signal associated with the temperature of the drive circuitry, wherein the controller is operative for receiving the temperature signal and adjusting the charge current delivered to the induction charge transmission coil in response to the temperature signal. Optionally, the controller may be further operative for sensing presence of an electronic device receiving coil drawing power from the induction charge transmission coil and for selectively driving the induction charge transmission coil. Where the system includes multiple induction charge transmission coils, the controller may be further operative for sensing presence of an electronic device receiving coil drawing power from one or more of the induction charge transmission coils and for selectively driving each of the induction charge transmission coils drawing power.

Though described primarily with respect to a checker-assisted data reader, the readers and methods described herein may be employed in a self-checkout system.

It is intended that subject matter disclosed in one portion herein can be combined with the subject matter of one or more of other portions herein as long as such combinations are not mutually exclusive or inoperable.

The terms and descriptions used above are set forth by way of illustration only and are not meant as limitations. Those skilled in the art will recognize that many variations can be made to the details of the above-described embodiments without departing from the underlying principles of the invention.

The invention claimed is:

1. A system for retail checkout, comprising:
a checkstand including a counter with a counter surface;
a plurality of at least first and second induction charge transmission coils embedded in or disposed below the counter at selected charge positions about the checkstand, wherein the selected charge positions are distributed with various patterns about the counter surface;
a cordless peripheral device positionable and movable between multiple positions about the counter surface, the cordless peripheral device including an induction charge receiving coil operable to receive a charge current from one of the induction charge transmission coils when the cordless peripheral device is placed in proximity of a selected one of the selected charge positions on the checkstand; and
a controller including drive circuitry operable for detecting presence of the peripheral device by sequentially checking each of the plurality of induction charge transmission coils by
 detecting for presence of the induction charge receiving coil of the peripheral device at the first induction charge transmission coil by comparing a first measured signal on the first induction charge transmission coil to a previously obtained first reference signal,
 detecting for presence of the induction charge receiving coil of the peripheral device at the second induction charge transmission coil by comparing a second measured signal on the second induction charge transmission coil to a previously obtained second reference signal,
 powering on a respective induction charge transmission coil if presence of the induction charge receiving coil is detected, and
 powering off a respective induction charge transmission coil if presence of the induction charge receiving coil is not detected.

2. A system according to claim 1, wherein the cordless peripheral device comprises a data reader selected from the group consisting of: a handsfree scanner; a cradle and removable handheld scanner combination; and a handheld scanner.

3. A system according to claim 1, further comprising:
a temperature sensing component for generating a signal associated with the temperature of the drive circuitry,
wherein the controller includes drive circuitry operable for controlling charge current delivered to the first and second induction charge transmission coils,
wherein the controller is further operable for receiving the signal and adjusting the charge current delivered to the induction charge transmission coil in response to the signal,
wherein the cordless peripheral device includes a charging indicator to produce illumination in response to the cordless peripheral device being placed in proximity of the selected one of the selected charge positions on the checkstand.

4. A system according to claim 1, further comprising:
an efficiency monitoring component electrically connected to at least one of the first and second induction charge transmission coils and establishing a signal associated with a derived efficiency of the induction charge transmission coil, wherein the controller is operable for receiving the signal and adjusting the charge current delivered to the induction charge transmission coil to maintain resonance between the induction charge transmission coil and the induction charge receiving coil in response to the derived efficiency.

5. A system according to claim 1, further comprising:
a charging indicator to produce illumination in response to the cordless peripheral device being placed in proximity of the selected one of the selected charge positions on the checkstand, wherein the illumination has a controllable intensity level that is controlled to assist a user in positioning the cordless peripheral device in the proximity of the selected one of the selected charge positions on the checkstand.

6. A system according to claim 1, wherein the counter surface includes a lowered shelf section.

7. A method of facilitating retail checkout, comprising:
arranging a plurality of at least first and second induction charge transmission coils embedded in or disposed below a counter at selected charge positions about a checkstand, wherein the selected charge positions are distributed with various patterns about a surface of the counter;
obtaining a first reference signal for the first induction charge transmission coil in response to a first stimulus signal and storing said first reference signal;
obtaining a second reference signal for the second induction charge transmission coil in response to a second stimulus signal and storing said second reference signal;
moving a cordless peripheral device between multiple positions about the counter, the cordless peripheral device including an induction charge receiving coil operable to receive a charge current from one of the induction charge transmission coils when the cordless peripheral device is placed on the surface of the counter in proximity of one of the selected charge positions;
detecting for presence of the peripheral device by sequentially checking each of the first and second induction charge transmission coils by
 detecting for presence of the induction charge receiving coil of the peripheral device at the first induction charge transmission coil by comparing a first measured signal on the first induction charge transmission coil to the first reference signal,
 detecting for presence of the induction charge receiving coil of the peripheral device at the second induction charge transmission coil by comparing a second measured signal on the second induction charge transmission coil to the second reference signal;
powering on a respective induction charge transmission coil if presence of the induction charge receiving coil is detected; and
powering off a respective induction charge transmission coil if presence of the induction charge receiving coil is not detected.

8. A method according to claim 7, further comprising:
producing illumination in response to the cordless peripheral device being placed in proximity of the selected one of the selected charge positions on the checkstand by controlling an intensity level of the illumination so as to assist a user in positioning the cordless peripheral device in the proximity of the selected one of the selected charge positions on the checkstand.

9. A method according to claim 8, wherein the step of sensing presence of a peripheral device receiving coil drawing power comprises monitoring a change in drive current at the specific induction charge transmission coil.

10. A method according to claim 8, wherein the step of sensing presence of a peripheral device receiving coil drawing power comprises monitoring a change in inductance at the specific induction charge transmission coil.

11. A method according to claim 8, further comprising charging only the cordless peripheral device in response to the sensing presence of the cordless peripheral device receiving coil drawing power from a specific induction charge transmission coil.

12. A method according to claim 7, wherein the cordless peripheral device comprises a data reader selected from the group consisting of: a handsfree scanner; a cradle and removable handheld scanner combination; and a handheld scanner.

13. A method according to claim 7, further comprising:
controlling, via drive circuitry, charge current delivered to the induction charge transmission coils;
sensing temperature at the drive circuitry and generating a signal associated with the temperature; and
adjusting the charge current delivered to the induction charge transmission coil in response to the signal associated with the temperature,
wherein the cordless peripheral device includes a charging indicator to produce the illumination.

14. A charging system, comprising:
a work surface;
a plurality of at least first and second induction charge transmission coils embedded in or disposed below the work surface at selected charge positions, wherein the selected charge positions are distributed with various patterns about the work surface;
a cordless peripheral device positionable and movable between multiple positions about the surface, the cordless peripheral device including an induction charge receiving coil operable to receive a charge current from one or more of the induction charge transmission coils when the cordless peripheral device is placed in proximity of a selected one of the selected charge positions on the work surface; and
a controller operable for sensing presence of a peripheral device receiving coil drawing power from a specific induction charge transmission coil and for selectively driving only that specific induction charge transmission coil and removing drive current from other induction charge transmission coils not in use by detecting for presence of the peripheral device by sequentially checking each of the plurality of induction charge transmission coils by
detecting for presence of the induction charge receiving coil of the peripheral device at the first induction charge transmission coil by comparing a first measured signal on the first induction charge transmission coil to previously obtained first reference signal,
detecting for presence of the induction charge receiving coil of the peripheral device at the second induction charge transmission coil by comparing a second measured signal on the second induction charge transmission coil to a previously obtained second reference signal,
powering on a respective induction charge transmission coil if presence of the induction charge receiving coil is detected, and
powering off a respective induction charge transmission coil if presence of the induction charge receiving coil is not detected.

15. A system according to claim 14, wherein the cordless peripheral device comprises a data reader selected from the group consisting of: a handsfree scanner; a cradle and removable handheld scanner combination; and a handheld scanner.

16. A system for charging electrical storage of an electronic device, comprising:
at least a first induction charge transmission coil disposed at a selected first charge position and a second induction charge transmission coil disposed at a selected second charge position;
a charging indicator to produce illumination in response to the electronic device being positioned over a selected one of the first and second induction charge transmission coils;
a controller including drive circuitry operable for controlling charge current delivered to the first and second induction charge transmission coils by
detecting for presence of the induction charge receiving coil of the peripheral device at the first induction charge transmission coil by comparing a first measured signal on the first induction charge transmission coil to previously obtained first reference signal,
detecting for presence of the induction charge receiving coil of the peripheral device at the second induction charge transmission coil by comparing a second measured signal on the second induction charge transmission coil to a previously obtained second reference signal,
powering on a respective induction charge transmission coil if presence of the induction charge receiving coil is detected, and
powering off a respective induction charge transmission coil if presence of the induction charge receiving coil is not detected; and
a temperature sensing component for generating a temperature signal associated with the temperature of the drive circuitry,
wherein the controller is operable for receiving the temperature signal and adjusting the charge current delivered to the respective induction charge transmission coil in response to the temperature signal,
wherein the electronic device is configured to control an intensity level of the illumination to assist a user in positioning the electronic device over the respective induction charge transmission coil.

17. A system according to claim 16, wherein the controller is further operable for sensing presence of an electronic device receiving coil drawing power from the induction charge transmission coil and for selectively driving the induction charge transmission coil.

18. A system according to claim 16, wherein the charge indicators comprise light-emitting diodes.

19. A system according to claim 16, wherein the at least one induction charge transmission coil disposed at a selected charge position comprises multiple induction charge transmission coils distributed with various patterns about a work surface.

20. A system according to claim 1, wherein the cordless peripheral device includes a charging indicator to produce illumination in response to the cordless peripheral device being placed in proximity of the selected one of the selected charge positions on the checkstand, and the cordless peripheral device is configured to control the illumination intensity to assist a user in positioning the cordless peripheral device in the proximity of the selected one of the selected charge positions on the checkstand.

21. A method according to claim 7 further comprising using the same first and second induction charge transmission coils for both detecting for presence of the induction charge receiving coil and charging the induction charge receiving coil.

22. A system according to claim 14 wherein the controller uses the same first and second induction charge transmission coils for both detecting for presence of the induction charge receiving coil and charging the induction charge receiving coil.

* * * * *

UNITED STATES PATENT AND TRADEMARK OFFICE
CERTIFICATE OF CORRECTION

PATENT NO. : 9,515,512 B2
APPLICATION NO. : 13/327643
DATED : December 6, 2016
INVENTOR(S) : Patrick M. O'Donnell, Jon P. C. Williams and Cameron G. Breckenridge Page 1 of 1

It is certified that error appears in the above-identified patent and that said Letters Patent is hereby corrected as shown below:

In the Specification

<u>Column 3</u>
Line 54, after "base" change "70" to --60--.

<u>Column 10</u>
Line 15, after "then" delete "process".
Line 16, before "416" insert --step--.
Line 19, after "then" delete "process".
Line 35, after "includes" insert --at--.

In the Claims

<u>Column 14</u>
Line 50, change "charge indicators comprise" to --charging indicator comprises--.

Signed and Sealed this
Fourth Day of September, 2018

Andrei Iancu
*Director of the United States Patent and Trademark Office*